A. B. KNOWLTON.
BED PAN.
APPLICATION FILED JULY 3, 1913.

1,091,352. Patented Mar. 24, 1914.

WITNESSES
E. W. Callaghan
Amos W. Hart

INVENTOR
AUGUSTUS B. KNOWLTON,
BY Munn & Co.
ATTORNEYS

UNITED STATES PATENT OFFICE.

AUGUSTUS B. KNOWLTON, OF COLUMBIA, SOUTH CAROLINA.

BED-PAN.

1,091,352.

Specification of Letters Patent. Patented Mar. 24, 1914.

Application filed July 3, 1913. Serial No. 777,255.

*To all whom it may concern:*

Be it known that I, AUGUSTUS B. KNOWLTON, a citizen of the United States, and a resident of Columbia, in the county of Richland and State of South Carolina, have invented an Improvement in Bed-Pans, of which the following is a specification.

This invention is an improvement in that type of bed-pans which are provided with more than one chamber or receptacle for excreta.

My pan is constructed with a central, longitudinal, primary chamber or receptacle and with an overflow receptacle which partly surrounds the primary one, and a third receptacle into which both the others finally discharge their contents. Such final receptacle is located at one end of the pan and is so constructed as to hold the excreta safely when the pan is carried, in vertical position like a pail or bucket, by means of a handle located at the opposite end of the pan. Further, the final receptacle is constructed with a flat head or end so that it may be supported in vertical position upon a floor or other flat surface.

The details of construction, arrangement, and operation of the bed-pan are as hereinafter described with reference to the accompanying drawing, in which—

Figure 1:
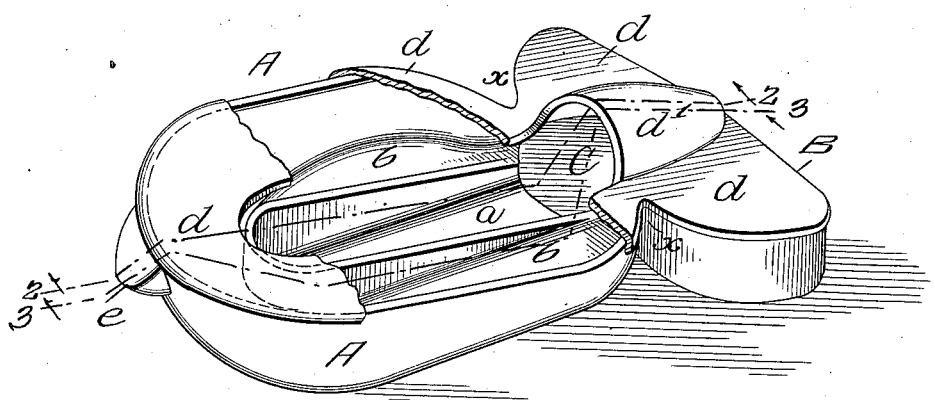
Figure 2:
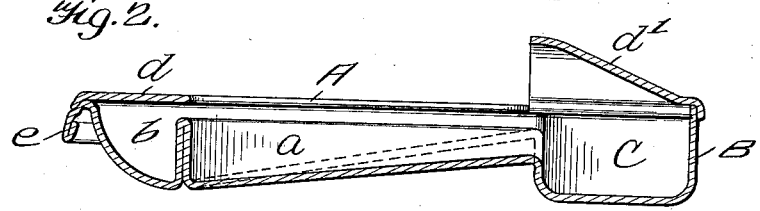
Figures 3, 4:
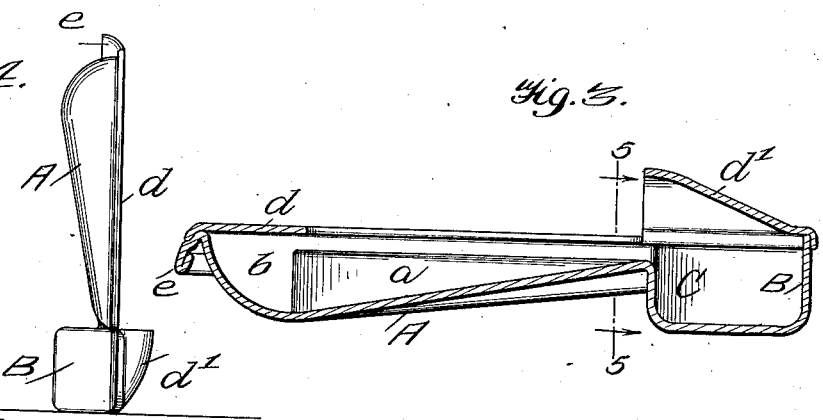
Figure 5:
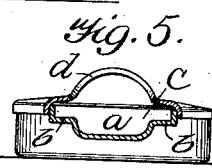

Figure 1 is a perspective view of the pan, part of the cover of the same being broken away to show interior construction. Fig. 2 is a central longitudinal section on the line 2—2 of Fig. 1. Fig. 3 is a longitudinal section on the line 3—3 of Fig. 1. Fig. 4 is a side view of the pan set and supported endwise upon a flat surface. Fig. 5 is a cross section on the line 5—5 of Fig. 3.

The body or main portion A of the bed-pan has a central primary receiving chamber or receptacle $a$, and a U-shaped overflow chamber or receptacle $b$ partly surrounds it. Both these receptacles $a$ and $b$ are arranged to discharge into the final receptacle $c$, in part B. A cover $d$ extends over the overflow receptacle $b$ and final receptacle $c$, it being provided with a longitudinal opening which coincides practically with the primary receptacle $a$ and from which it is separated vertically by a narrow space, as shown in Figs. 2 and 3. The cover is provided on the upper side and over the center of the final receptacle $c$ with a raised pouring lip $d'$, and at the opposite end of the body of the pan with an integral handle $e$ for convenience in carrying the pan in vertical suspended position, and in otherwise manipulating the same.

It will be understood that, in practical use, the covered portion of the pan which is in front of the pouring lip $d'$ will be placed under the patient's body, and that the excreta discharged will lodge in the primary receptacle $a$. The weight of the patient resting upon the body of the pan in this manner, the latter is of course depressed at its larger or bulbous end, and the excreta may overflow into the U-shaped receptacle $b$. The mouths or discharge ends of the receptacles $a$ and $b$ permit discharge of their contents directly into the final receptacle $c$. The bottoms of both receptacles $a$ and $b$ are inclined downward or backward from the final receptacle $c$, so that ordinarily they do not discharge into the latter unless the handle end of the pan be raised. The capacity of the final receptacle $c$ is, however, such that it will contain all the liquid and solid excreta ordinarily received by the receptacles $a$ and $b$.

By inverting the pan and otherwise properly manipulating it, as will be readily understood, the contents of the final receptacle $c$ may be discharged from the pouring lip $d'$. Further, the flat end or head of the portion B adapts the pan to be supported in vertical position upon a flat surface, as shown in Fig. 4, which is often a matter of great convenience. Also, the pan may be carried in such vertical position by means of the handle $e$, whether it be filled or empty.

As shown in Fig. 1, the parts A and B are narrowed or contracted at their junction $x$, so that the discharge ends of the receptacles $a$ and $b$ are correspondingly narrowed or contracted laterally, whereby I provide a vertical front wall for the final receptacle $c$. This form also provides what may be termed projections or handholes, which are often a convenience in manipulating the pan, especially in withdrawing it from under the patient.

While the pan as a whole may be constructed of various materials, I preferably make it of burnt clay, since this permits forming the entire base portion A, B, by molding at one operation; and the cover $d, d'$ may also be struck up or molded in one operation and then luted to the under portion of the pan.

I claim:—

1. A bed-pan comprising a primary central receptacle arranged longitudinally and an end or final receptacle into which the first-named one discharges, the bottom of the latter being inclined up to its mouth or discharge end which is higher than the bottom of the final receptacle, as described.

2. The improved bed-pan comprising a central primary receptacle, an overflow receptacle partly surrounding the first-named one and into which such primary one is adapted to discharge, and a final receptacle arranged at one end of the first-named receptacles and communicating therewith, as described.

3. The improved bed-pan comprising a body portion having a central longitudinal primary receptacle, a U-shaped overflow receptacle partly surrounding the first-named one, an end or final receptacle communicating with both the others, and a cover extending over the whole except the central receptacle, and provided with a pouring lip, as described.

4. The improved bed-pan comprising a body portion having a central receptacle and an adjacent overflow receptacle and an end portion having a final receptacle which communicates with the others, the pan being contracted at the junction of the two portions, as and for the purpose specified.

AUGUSTUS B. KNOWLTON.

Witnesses:
EDYTHE WELBOURNE,
JOHNNIE C. RAWL.

Copies of this patent may be obtained for five cents each, by addressing the "Commissioner of Patents, Washington, D. C."